(12) United States Patent
Wininger

(10) Patent No.: US 6,833,828 B1
(45) Date of Patent: Dec. 21, 2004

(54) MODIFIED BROWSER SYSTEM

(75) Inventor: Shay Wininger, Haifa (IL)

(73) Assignee: Trimus Ltd, Haifa (IL)

( * ) Notice: Subject to any disclaimer, the term of this patent is extended or adjusted under 35 U.S.C. 154(b) by 165 days.

(21) Appl. No.: 10/148,480

(22) PCT Filed: Nov. 28, 2000

(86) PCT No.: PCT/IL00/00794

§ 371 (c)(1),
(2), (4) Date: Oct. 3, 2002

(87) PCT Pub. No.: WO01/40917

PCT Pub. Date: Jun. 7, 2001

Related U.S. Application Data

(60) Provisional application No. 60/167,981, filed on Nov. 30, 1999.

(51) Int. Cl.[7] .............................................. G06T 15/00
(52) U.S. Cl. ..................... 345/419; 345/850; 709/225
(58) Field of Search ................................ 345/419, 418, 345/782, 168, 848, 850; 709/223, 225, 226, 245

(56) References Cited

U.S. PATENT DOCUMENTS

| | | | |
|---|---|---|---|
| 4,809,065 A | 2/1989 | Harris et al. ................... 358/88 |
| 5,751,289 A | 5/1998 | Myers ......................... 345/419 |
| 5,889,951 A | 3/1999 | Lombardi .............. 395/200.49 |
| 6,008,814 A | * 12/1999 | Baldwin et al. ............ 345/427 |
| 6,616,701 B2 | * 9/2003 | Doyle ..................... 715/501.1 |

FOREIGN PATENT DOCUMENTS

| | | | |
|---|---|---|---|
| EP | 1093089 | * | 4/2003 |
| JP | 2002288236 | * | 10/2003 |

OTHER PUBLICATIONS

U.S. Appl. No. 60/167,981, Wininger, filed Nov. 30, 1999.

* cited by examiner

*Primary Examiner*—Kent Chang
(74) *Attorney, Agent, or Firm*—Woodcock Washburn LLP

(57) ABSTRACT

A method for displaying data, including receiving data including one or more Universal Resource Locators (URLs) and one or more corresponding resources, each of which resource is adapted to be displayed as a 2D image on a screen. The method further includes analyzing the data to determine the one or more URLs, determining a respective content for each of the one or more URLs responsive to the received data, and generating on the screen a 3D object corresponding to at least one of the resources responsive to the data and the content.

20 Claims, 4 Drawing Sheets

MODIFIED BROWSER SYSTEM

CROSS-REFERENCE TO RELATED APPLICATIONS

This application claims the benefit of U.S. Provisional Patent Application No. 60/167,981 filed Nov. 30, 1999, which is incorporated herein by reference.

FIELD OF THE INVENTION

The present invention relates generally to data presentation, and specifically to presentation of data received from a distributed network in a three dimensional format.

BACKGROUND OF THE INVENTION

Typically, when a user of a hypermedia system such as the World Wide Web accesses a site in the Web, the user initially downloads a starting or home page of the site which is displayed on a screen of the user. The home page acts as a starting point within the site from where the user may navigate to other resources whose locations on the Web are indicated by corresponding Uniform Resource Locators (URLs). The most common way of accessing Web resources is by using a browser program, which converts Web pages, typically represented by textual code, such as Hypertext Mark-up Language (HTML) code, to graphic images on the user's computer screen. Hyperlinks are shown on the Web page by a suitable "hot button," (typically shown by default as blue, underlined text), interactive site maps, push-buttons and other special images, as are known in the art. The user typically invokes a hyperlink by pointing to and clicking on the corresponding hot button, using a mouse or other pointing device. The browser program then issues a Hypertext Transfer Protocol (HTTP) request to the URL of the hyperlink, and in response, the requested data are downloaded to the user's computer.

When the user clicks on a hot button to select the corresponding hyperlink, he or she generally has little information about the nature of the corresponding linked resource, such as its size, format, file type or contents, other than information that has been explicitly included in a source page showing the hot button. It would be useful for the user to know information about the data offered by a particular hyperlink, such as type of contents, before selecting the corresponding hot button, rather than afterwards as is generally the case at present.

Methods for formatting data as a three-dimensional (3D) presentation are known in the art. U.S. Pat. No. 5,889,951 to Lombardi, whose disclosure is incorporated herein by reference, describes a system for downloading a plurality of resources, and displaying each of the resources as a 3D image on a screen of the user.

Virtual Reality Modeling Language (VRML), provided by Cosmo Software of Mountain View, California, is a language for the animation and 3D modeling of geometric shapes. It allows 3D scenes to be viewed and manipulated over the Internet in an interactive environment. Preferably, a user operates a special VRML viewer and connects to a site which has been created in 3D and saved in VRML format.

SUMMARY OF THE INVENTION

It is an object of some aspects of the present invention to provide a method for displaying data received from a hypermedia system in a three-dimensional format.

It is further object of some aspects of the present invention to provide a method for displaying data received from a hypermedia system as one or more three-dimensional data objects each comprising content received from the system.

In preferred embodiments of the present invention, a three-dimensional-enabled workstation, herein termed a 3D-enabled workstation, is coupled to a distributed network such as the Internet. The 3D-enabled workstation is able to present 3D environments of resources comprised in content derived from the network. One or more content providers, at least some of which are implemented so as to provide content in an industry-standard format and which are herein termed standard providers, are also coupled to the network. Most preferably, at least some of the content providers, herein termed 3D providers, are implemented so as to provide additional data to the industry-standard content. The additional data enables the 3D-enabled workstation to present the industry-standard content in a 3D format. In each type of provider the content comprises one or more linkable resources, each resource being accessed by a respective Universal Resource Locator (URL).

The 3D-enabled workstation is implemented so as to be able to receive content from both types of provider, and to determine the one or more resources within the content. Each resource which has been so determined is presented at the workstation as a corresponding 3D data object, each 3D data object being indicative of content of its respective resource. Implementing the 3D-enabled workstation to be able to display at least some resources as 3D data objects indicative of content of the respective resources significantly improves the speed and the ability of the workstation to convey information about the content to a workstation user.

In preferred embodiments of the present invention, the additional data provided by the 3D provider is generated when the industry-standard content of the 3D provider is created. Alternatively, the additional data is generated subsequent to the creation of the industry-standard content. The additional data provided by the 3D provider comprises content-sensitive information for each resource in the content, simplifying the task of the 3D-enabled workstation in presenting the content. In addition, the additional data from the 3D provider is most preferably implemented in a manner customized to preferences of the provider. Hereinbelow the term "3D formatted content" is used to describe industry-standard content together with its associated additional data. 3D formatted content provided by the present invention can be transferred at a significantly faster rate, and is significantly simpler to implement, than other three-dimensional content, such as Virtual Reality Modeling Language (VRML) content, known in the art.

In preferred embodiments of the present invention, the content provided by the standard provider is converted into 3D formatted content by the 3D-enabled workstation. The 3D-enabled workstation generates the appropriate additional data for the content "on-the-fly" by a method similar to that performed in the 3D provider.

In some preferred embodiments of the present invention, the resources in the content are categorized as local links or remote links. Local links are resources which are related to each other and to the original content provider. Remote links are not related to the original content provider. The 3D data objects representing local links and remote links are most preferably different visually, so that a user is able to differentiate between the two types of links easily.

Analysis of at least some resources into a content-sensitive format, and presentation of the at least some resources as 3D data objects, enables the user of the 3D workstation to view information about the content of the at least some resources simultaneously. Furthermore, preferred embodiments of the present invention comprise one or more methods, such as presenting different viewpoints of the 3D data objects, for the user to navigate to a specific resource. Navigation to the specific resource is facilitated by the 3D format presentation, compared to navigation to a specific resource in industry-standard format.

There is therefore provided, according to a preferred embodiment of the present invention, a method for displaying data, including:

receiving data including one or more Universal Resource Locators (URLs) and one or more corresponding resources, each of which resources is adapted to be displayed as a two-dimensional image on a screen;

analyzing the data to determine the one or more URLs;

determining a respective content for each of the one or more URLs responsive to the received data; and generating on the screen a three-dimensional object corresponding to at least one of the resources responsive to the data and the content.

Preferably, receiving the data includes receiving the data via a distributed network.

Further preferably, receiving the data includes storing the data in a content provider, and generating on the screen the three-dimensional object includes transmitting the data via a distributed network to a workstation coupled to the screen.

Preferably, determining the respective content includes generating additional data responsive to the content, and generating the three-dimensional object includes generating the object responsive to the additional data.

Preferably, receiving the data includes storing the data in a content provider and transmitting the data via a distributed network to a workstation coupled to the screen, and generating the additional data includes generating the additional data in the workstation.

Preferably, generating the additional data includes generating one or more priorities corresponding to the one or more URLs, and generating on the screen the three-dimensional object includes generating the object responsive to the one or more priorities.

Preferably, analyzing the data includes determining an originator of the data, determining a respective content for each of the one or more URLs includes determining if each of the one or more URLs comprises the originator, and generating on the screen the three-dimensional object includes generating the three-dimensional object responsive to the determination.

Preferably, determining the respective content includes classifying the content into one or more categories chosen from a group including general forms, general tables, graphics, text pages, text pages with font information, and a type of media.

Preferably, generating the three dimensional object includes generating the object responsive to a position of a cursor on the screen.

Preferably, determining the respective content includes generating additional data responsive to the respective content, and generating the three-dimensional object includes generating a shape of the object responsive to the additional data and applying a material determined responsive to the content to the shape.

There is further provided, according to a preferred embodiment of the present invention, apparatus for displaying data, including:

a workstation which is adapted to receive data including one or more Universal Resource Locators (URLs) and one or more corresponding resources, to analyze the data to determine the one or more URLs, and to determine a respective content for each of the one or more URLs responsive to the received data; and a screen which is coupled to the workstation and which is adapted to display a three-dimensional object corresponding to at least one of the resources responsive to the data and the content.

Preferably, the workstation is adapted to receive the data via a distributed network and to determine the respective content via the distributed network.

Preferably, the apparatus includes a content provider which is adapted to store the data and to convey the data via a distributed network to the workstation.

Preferably, the workstation is adapted to generate additional data responsive to the content, and the screen is adapted to display the three-dimensional object responsive to the additional data.

Further preferably, the additional data includes one or more priorities corresponding to the one or more URLs, and the workstation is adapted to generate the three-dimensional object on the screen responsive to the one or more priorities.

Preferably, the apparatus includes an originator of the data, and the workstation is adapted to determine if each of the one or more URLs comprises the originator, and the workstation is adapted to generate the three-dimensional object on the screen responsive to the determination.

Further preferably, the workstation is adapted to determine the content as one or more categories chosen from a group including general forms, general tables, graphics, text pages, text pages with font information, and a type or media.

Preferably, the workstation is adapted to generate the three-dimensional object responsive to a position of a cursor on the screen.

Preferably, the apparatus includes a content provider which is adapted to receive the data, to analyze the data to determine the one or more URLs, and to determine the respective content for each of the one or more URLs responsive to the received data.

Further preferably, the content provider is adapted to generate additional data responsive to the content and to convey the additional data to the workstation.

The present invention will be more fully understood from the following detailed description of the preferred embodiments thereof, taken together with the drawings, in which:

DETAILED DESCRIPTION OF PREFERRED EMBODIMENTS

Figure 1:
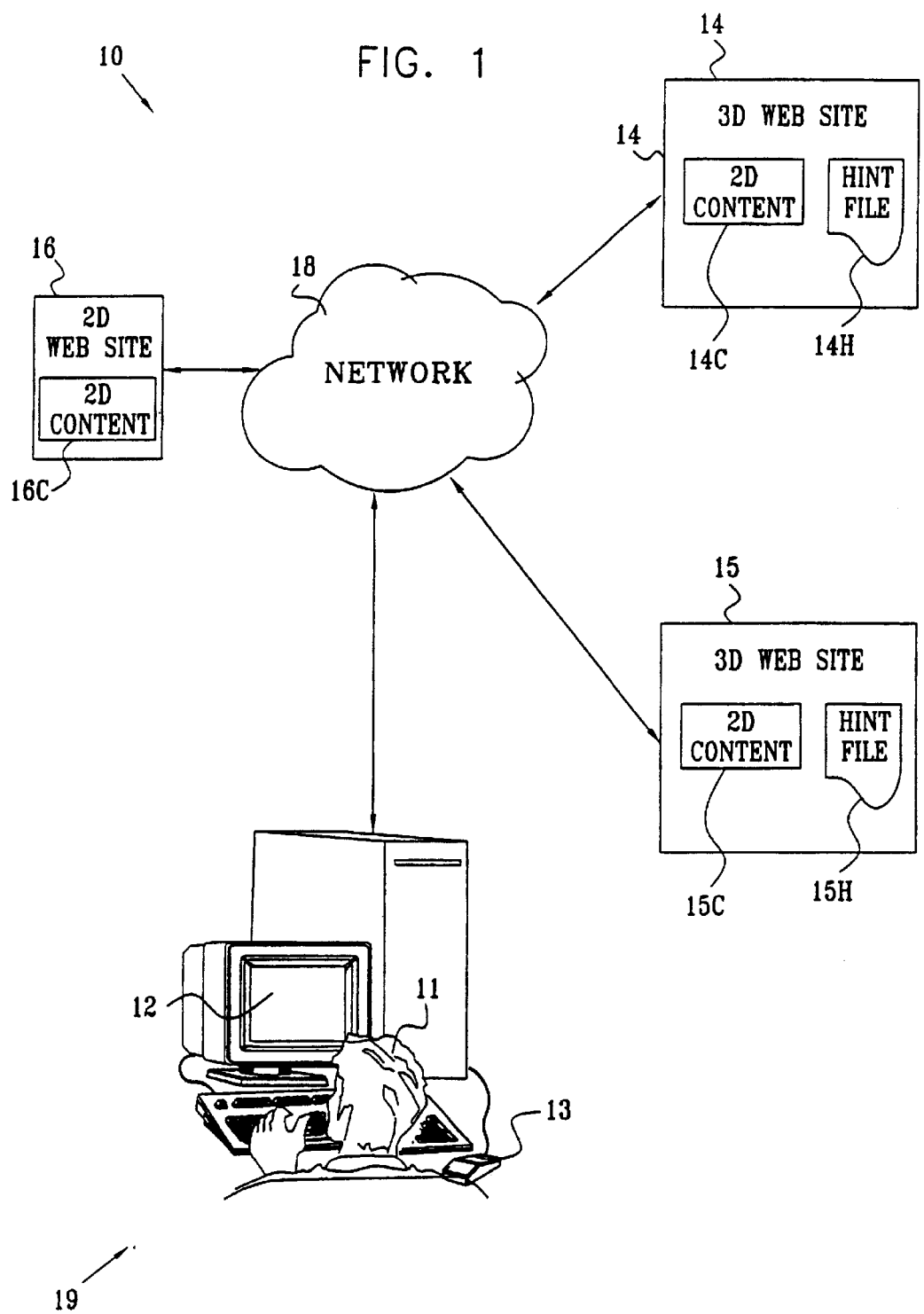
FIG. 1 is a schematic illustration of a three-dimensional display system, according to a preferred embodiment of the present invention.

Reference is now made to FIG. 1, which is a schematic illustration of a three-dimensional (3D) display system 10, according to a preferred embodiment of the present invention. A three-dimensional-enabled workstation 12, herein termed a 3D-enabled workstation, comprises an industry standard browser such, as the Internet Explorer browser provided by Microsoft Inc. of Portland, Oreg. Workstation 12 comprises a screen and is coupled by means know in the art to a distributed network 18, such as the Internet, and is operated by a user 11, preferably via a pointing device 13. Coupled to network 18 is a content provider 16 which is able to provide content 16C in an industry-standard form, for example as files in a hypertext markup language (HTML) format. Content 16C from provider 16 comprises a first set of one or more resources having corresponding Universal Resource Locators (URLs). Preferably, provider 16 is a server dedicated to providing the content in industry-standard form to the Internet.

A first 3D content provider 14 and a second 3D content provider 13 are coupled to the network. Providers 14 and 15 comprise respective industry-standard content 14C and 15C, and are adapted to provide this content in a 3D format to network 18. As is explained in more detail hereinbelow, providers 14 and 15 comprise respective hint files 14H and 15H which comprise additional data used to convert the industry-standard content into a 3D format. Preferably, providers 14 and 15 each comprise a respective server which provides content to the Internet. Most preferably, content provider 15 is accessible to workstation 12 on an automatic or semi-automatic basis, as is explained in more detail below. In order to receive content from providers 14, 15, and 16, user 11 inputs a respective URL, herein termed an originator URL, to network 18, thereby gaining access to the respective content.

The industry-standard browser comprised in workstation 12 comprises a 3D add-on application 19 which enables the browser to present industry-standard content provided by content provider 16 as one or more 3D data objects. In the context of the present patent application and in the claims, the term "3D data object" refers to a data structure defining a geometric shape built from vertices and faces. Application 19 is also able to present content from providers 14 and 15 as one or more 3D data objects, using the respective hint files. Functions performed by 3D application 19 are described in more detail below. Add-on applications are well known in the art as programs which enhance the operation of industry-standard browsers.

Figure 2:
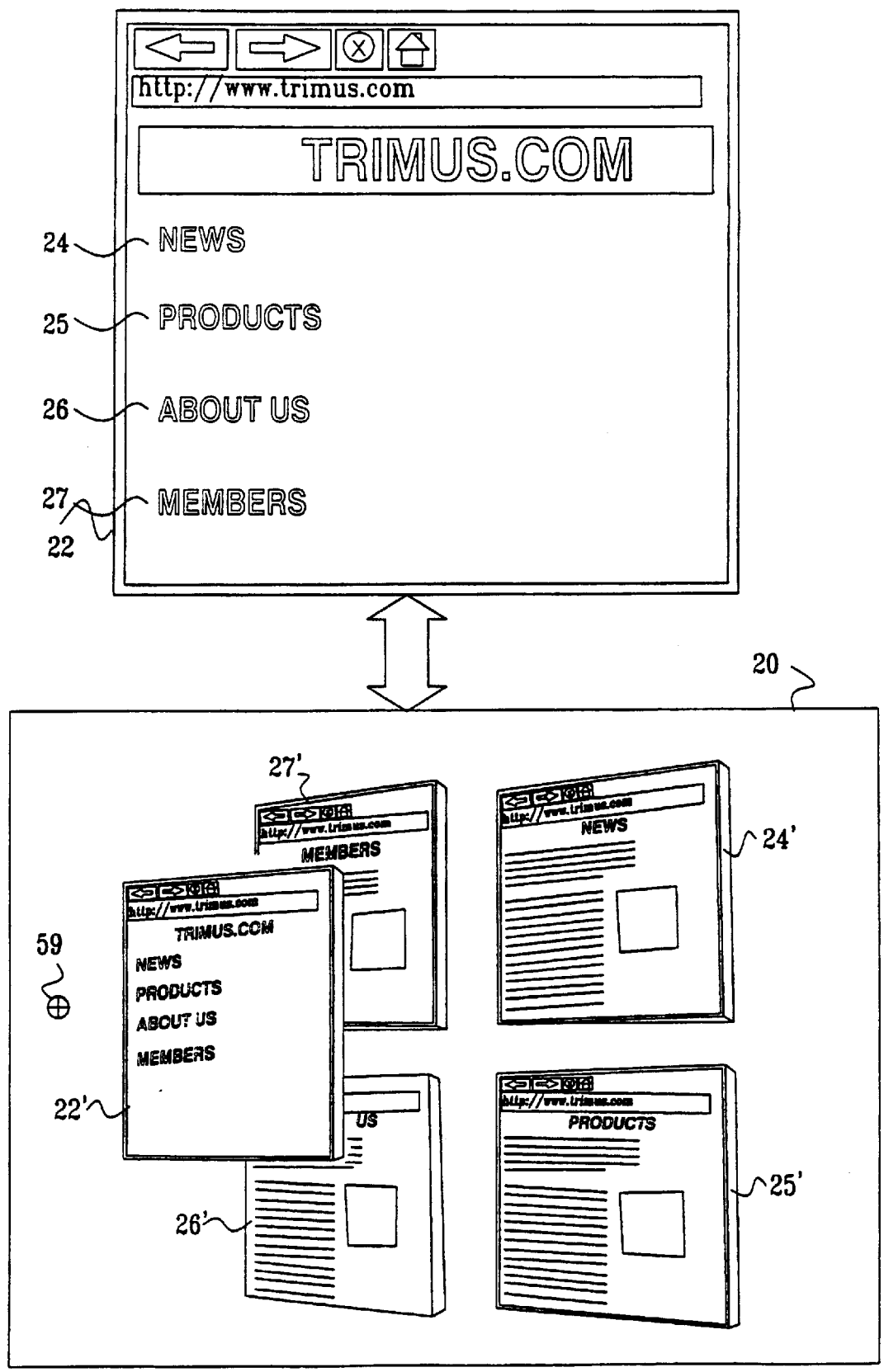
FIG. 2 is a schematic diagram of a workspace in the system of FIG. 1, according to a preferred embodiment of the present invention.

FIG. 2 is a schematic diagram of a workspace 20, according to a preferred embodiment of the present invention. In the context of the present patent application and in the claims, the term "workspace" refers to a predefined screen area used to display 3D content. Workspace 20 is generated by the browser and 3D add-on application 19 of workstation 12 FIG. 1), on receipt of content from provider 16. Alternatively, workspace 20 is generated on receipt of content from provider 14. The content from either provider 14 or from provider 16 is received by user 11 accessing an appropriate originator URL corresponding to the provider, from workstation 12. An image 22 illustrates as a comparison how the same content is presented by an industry-standard browser without 3D application 19. Within image 22 are hyperlinked regions 24, 25, 26, 27 which enable user 11 to access respective resources via network 18.

Workspace 20 most preferably comprises a 3D representation 22' of image 22. Regions 24', 25', 26', 27' in workspace 20 are respective hyperlinked 3D data objects of regions 24, 25, 26, 27. The 3D data objects include more information about the respective resources than is shown in the corresponding regions of image 22, as is described in detail hereinbelow.

Figure 3:
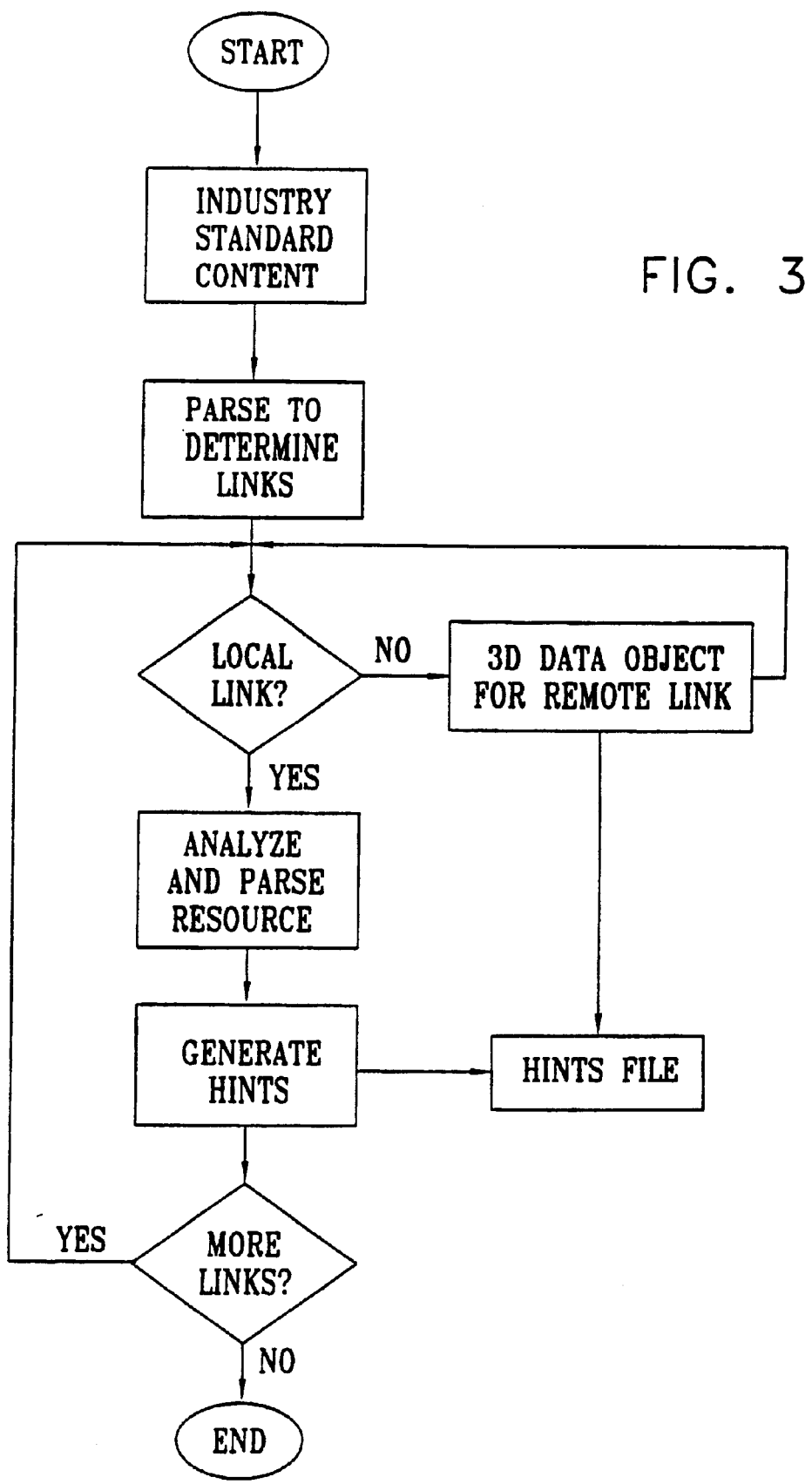
FIG. 3 is a flowchart showing a process for converting industry-standard content to three-dimensional formatted content, according to a preferred embodiment of the present invention.

FIG. 3 is a flowchart showing a process for converting industry-standard content to 3D formatted content, according to a preferred embodiment of the present invention. The process is implemented in 3D content provider 14, most preferably at a time when provider 14 is not coupled to network 18. In an initial step, an operator of provider 14 most preferably imports industry-standard content 14C corresponding to a resource, herein termed an originator resource, comprising a plurality of links corresponding to regions 24, 25, 26, 27 (FIG. 2), each link having a respective Universal Resource Locator (URL). Most preferably, industry-standard content 14C is a hypertext markup language (HTML) file. Typically, the originator resource corresponds to a home page of a site having an originator URL, for which provider 14 acts as a server.

In a parsing step, content 14C of the originator resource is analyzed and links to one or more other URLs within the content are located. As links are located, or alternatively after all the links within the content have been located, each link is checked, by analyzing the text context of the link according to methods known in the art, to determine if the link is to a page related to the originator resource. Links to pages related to the originator resource are herein termed local links. Links to pages unrelated to the originator resource are herein termed remote links.

If it is determined that the link is a remote link, one or more parameters corresponding to the remote link are stored in hint file 14H. Hint file 14H is used by workstation 12 to generate a 3D data object corresponding to each link in the industry-standard content. The 3D data objects are generated in workspace 20 of the workstation. Hint file 14H is described in more detail hereinbelow.

If the link is a local link, in an analysis and parse step the resource of each local link is analyzed to determine one or more attributes of the link. The analysis, performed by methods known in the art, generates ore or more categories which classify the content of the link. Content-classifying categories which are most preferably generated by the analysis comprise:

General forms/tables

Graphics

Text pages

Text pages with font information

One or more types of media, e.g., if the link is to an industry-standard sound or video or multimedia file.

Most preferably, the analysis is performed by parsing text and/or data, related to the link, comprised in the industry-standard content. Alternatively or additionally, the analysis is performed by parsing text and/or data derived by accessing the link. Content-classifying categories other than those listed above, derivable from text and/or data related to the link, will be apparent to those skilled in the art.

In a generate hints step, one or more parameters, corresponding to each of the categories attributed to a specific link in the analyze and parse step, are entered into hint file 14H. Most preferably, at least some of the categories and corresponding parameters are determined by the operator of provider 14, so that the presentation of the 3D data object on workstation 12 is at least partly determined by the operator of provider 14. In some preferred embodiments of the present invention, categories are assigned a priority, which priority is used when the 3D data object is generated.

The process described hereinabove is repeated for each link in the content imported into provider 14, until parameters have been generated and stored in hint file 14H for each link of the industry-standard content.

In an alternative process for generating the hint file, one process illustrated by FIG. 3 is implemented as a parallel process, by the operator of provider 14 generating industry-standard content 14C and hint file 14H at substantially the same time. Once hint file 14H has been generated, by one of the processes described hereinabove, provider 14 is coupled to networks 18 so that both industry-standard content 14C and hint file 14H corresponding to the content are available for downloading by workstation 12.

In preferred embodiments of the present invention, the process of FIG. 3 is also implemented by an operator of provider 15. The operator of provider 15 accesses a remote site, most preferably a popular site, which has content 15C which is in industry-standard format and which has not been reformatted by the operator of the remote site into 3D format. The operator of provider 15 downloads content 15C of the remote site to provider 15, and generates hint file 15H for the remote site according to the process of FIG. 3. Hint file 15H for the specific remote site is then stored in provider 15. Optionally content 15C of the remote site is also stored in provider 15, so that provider 15 acts as a mirror site of the remote site. It will be appreciated that provider 15 can store hint files corresponding to more than one remote sites, and optionally the contents of the respective more than one remote sites.

Figure 4:
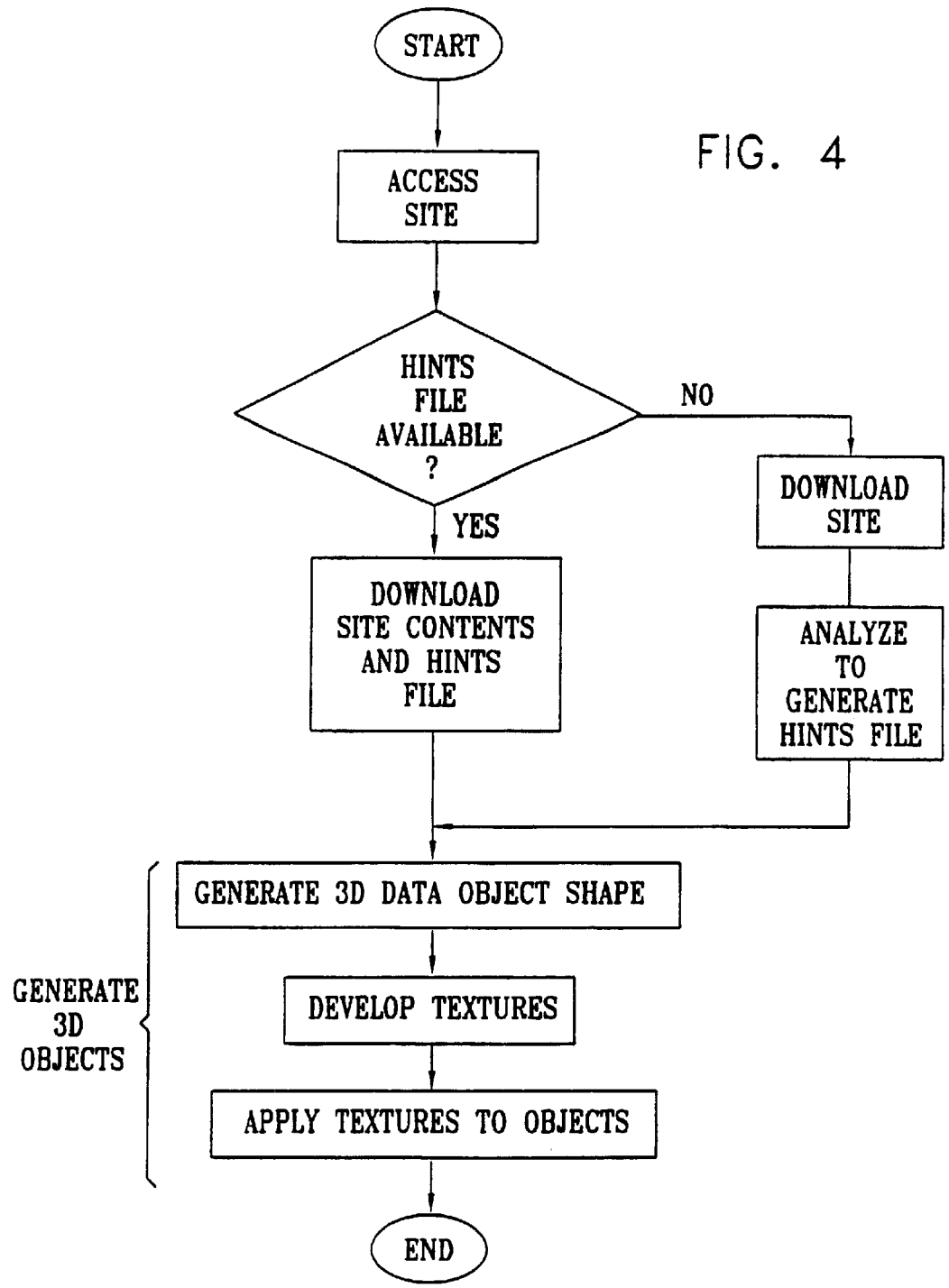
FIG. 4 is a flowchart showing a process for generating one or more three-dimensional data objects at a workstation of the system of FIG. 1, according to a preferred embodiment of the present invention.

FIG. 4 is a flowchart showing a process for generating one or more 3D data objects at workstation 12, according to a preferred embodiment of the present invention. In initial steps, workstation 12 accesses a site using an originator URL and determines whether the site comprises a hint file, as is the case if the site comprises content from provider 14. If the site does not comprise a hint file, workstation 12 most preferably accesses provider 15 to check if a hint file has been generated and stored therein, as described above with reference to FIG. 3. If a hint file is available, the industry-standard contents of the site and the hint file are downloaded to workstation 12.

If in the initial steps workstation 12 determines that the content from the site has not already been analyzed and stored in 3D format, i.e., that there is no hint file available, in a download step the workstation receives the industry-standard content from the provider. In a general analysis step a process substantially similar to that described above with reference to FIG. 3 is performed on the industry-standard content. The process is performed "on-the-fly" by workstation 12, so that a hint file corresponding to the site is generated in the workstation. Optionally, the hint file is stored in workstation 12 for future use by the workstation.

Workstation 12 utilizes the hint file to generate a 3D object for each local link, and these objects are displayed within workspace 20. 3D object generation is described in more detail below. If the hint file is derived from provider 14, it will be understood that at least some of the 3D objects for each local link will be of a form determined by the operator of provider 14, as described hereinabove, according to the categorization of the respective link. If the hint file is generated by workstation 12, or is received from provider 15, the form of the 3D objects defined by the hint file is most preferably in a predetermined generic form according to the categorization of the respective link. The hint file is also utilized by workstation 12 to generate a 3D object for each remote link. Most preferably, any links which are remote links are imaged as 3D objects having a predetermined generic form which user 11 of workstation 12 is able to recognize as a remote link.

In a first for generating a specific 3D object for each link, a shape of the object, as defined by the object's vertices, is determined using the hint file. The shape is most preferably chosen from a plurality of predetermined geometric shapes, substantially corresponding to the plurality of content-classifying categories described above with reference to FIG. 3. In a second step for generating the 3D object, material to be applied to a face or faces of the 3D shape is determined. The material comprises some or all of the content of the resource of the link, and/or one or more textures comprising visual parameters, such as color, brightness, highlighting, transparency, and shading, as are known in the art. The content is most preferably determined from the industry-standard content already downloaded. Alternatively, the content is determined by accessing the URL of the 3D object being generated. In a third 3D object generation step, the material is applied to one or more of the faces of the geometric shape of the object. In applying the material to the one or more faces, fitting factors are used. The fitting factors comprise parameters which mate the material with the one or more faces, according to the size and orientation of the faces. The process of generating 3D objects completes when all links for provider 16 have been transformed to such objects.

Returning to FIGS. 1 and 2, a cursor 59 within workspace 20 is controlled by user 11 via pointing device 13. As the user moves cursor 59 the effect in workspace 20 is substantially the same as if a camera imaging the 3D objects in the workspace moves. The effective camera movement changes the size and perspective of the 3D objects, so that user 11 is able to choose one or more objects which are to be visually enhanced. The enhancement is preferably performed by changing one or more factors affecting presentation of the material of the 3D object. Further most preferably, the enhancement comprises showing more detail of the content of the material, as it becomes possible to display the greater detail.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for displacing data, comprising:
   receiving data comprising one or more Universal Resource Locators (URLs) and one or more corresponding resources, each of which resources is adapted to be displayed as a two-dimensional image on a screen;
   analyzing the data to determine the one or more URLs;
   determining a respective content for each of the one or more URLs responsive to the received data; and
   generating on the screen a three-dimensional object corresponding to at least one of the resources responsive to the data and the content.

2. A method according to claim 1, wherein receiving the data comprises receiving the data via a distributed network.

3. A method according to claim 1, wherein receiving the data comprises storing the data in a content provider, and wherein generating on the screen the three-dimensional object comprises transmitting the data via a distributed network to a workstation coupled to the screen.

4. A method according to claim 1, wherein determining the respective content comprises generating additional data responsive to the content, and wherein generating the three-dimensional object comprises generating the object responsive to the additional data.

5. A method according to claim 4, wherein receiving the data comprises storing the data in a content provider and transmitting the data via a distributed network to a workstation coupled to the screen, and wherein generating the additional data comprises generating the additional data in the workstation.

6. A method according to claim 4, wherein generating the additional data comprises generating one or more priorities corresponding to the one or more URLs, and wherein generating on the screen the three-dimensional object comprises generating the object responsive to the one or more priorities.

7. A method according to claim 1, wherein analyzing the data comprises determining an originator of the data, wherein determining a respective content for each of the one or more URLs comprises determining if each of the one or more URLs comprises the originator, and wherein generating on the screen the three-dimensional object comprises generating the three-dimensional object responsive to the determination.

8. A method according to claim 1, wherein determining the respective content comprises classifying the content into one or more categories chosen from a group comprising general forms, general tables, graphics, text pages, text pages with font information, and a type of media.

9. A method according to claim 1, wherein generating the three dimensional object comprises generating the object responsive to a position of a cursor on the screen.

10. A method according to claim 1, wherein determining the respective content comprises generating additional data responsive to the respective content, and wherein generating the three-dimensional object comprises generating a shape of the object responsive to the additional data and applying a material determined responsive to the content to the shape.

11. Apparatus for displaying data, comprising:
   a workstation which is adapted to receive data comprising one or more Universal Resource Locators (URLs) and one or more corresponding resources, to analyze the data to determine the one or more URLs, and to determine a respective content for each of the one or more URLs responsive to the received data; and
   a screen which is coupled to the workstation and which is adapted to display a three-dimensional object corresponding to at least one of the resources responsive to the data and the content.

12. Apparatus according to claim 11, wherein the workstation is adapted to receive the data via a distributed network and to determine the respective content via the distributed network.

13. Apparatus according to claim 11, and comprising a content provider which is adapted to store the data and to convey the data via a distributed network to the workstation.

14. Apparatus according to claim 11, wherein the workstation is adapted to generate additional data responsive to the content, and wherein the screen is adapted to display the three-dimensional object responsive to the additional data.

15. Apparatus according to claim 14, wherein the additional data comprises one or more priorities corresponding to the one or more URLs, and wherein the workstation is adapted to generate the three-dimensional object on the screen responsive to the one or more priorities.

16. Apparats according to claim 11, and comprising an originator of the data, wherein the workstation is adapted to determine if each of the one or more URLs comprises the originator, and wherein the workstation is adapted to generate the three-dimensional object on the screen responsive to the determination.

17. Apparatus according to claim 11, wherein the workstation is adapted to determine the content as one or more categories chosen from a group comprising general forms, general tables, graphics, text pages, text pages with font information, and a type of media.

18. Apparatus according to claim 11, wherein the workstation is adapted to generate the three-dimensional object responsive to a position of a cursor on the screen.

19. Apparatus according to claim 11, and comprising a content provider which is adapted to receive the data, to analyze the data to determine the one or more URLs, and to determine the respective content for each of the one or more URLs responsive to the received data.

20. Apparatus according to claim 19, wherein the content provider is adapted to generate additional data responsive to the content and to convey the additional data to the workstation.

* * * * *